Patented Mar. 4, 1947

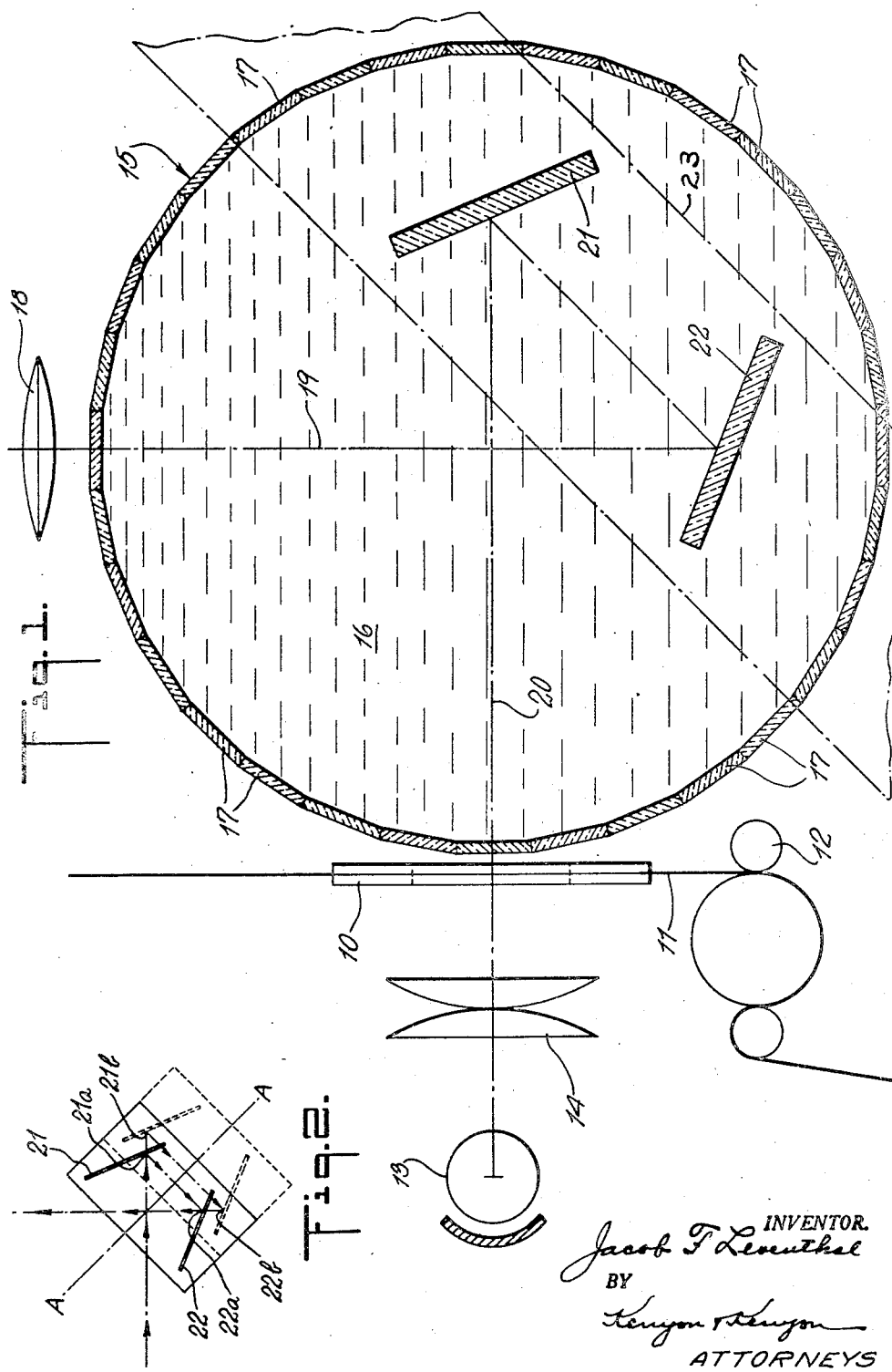

2,417,002

UNITED STATES PATENT OFFICE 2,417,002

OPTICAL COMPENSATOR

Jacob F. Leventhal, New York, N. Y., assignor to Leventhal Patents, Inc., Chattanooga, Tenn., a corporation of Delaware Application February 10, 1945, Serial No. 577,300

6 Claims. (Cl. 88—16.8)

This invention relates to optical compensators such as are used in a motion picture projector to produce stationary screen pictures from a continuously moving film, a projector of this type being illustrated in Leventhal Patent No. 2,013,661. Such a compensator comprises a transparent polygonal body having plane-parallel faces.

Certain conditions of motion picture projection by use of a projector of this type require that the successive film pictures fade into each other without an intervening shutter interval. In order to produce this effect, the displacement effected by the compensator for each picture frame must exactly equal the frame height. An outstanding obstacle to the realization of this condition is the fact that film shrinks and this results in a change of the amount of compensation that must be effected by the compensator.

An object of this invention is an optical compensator having provision for varying the amount of displacement of a light beam effected by it.

An optical compensator embodying the invention comprises a rotatable transparent container having an even number of flat exterior faces parallel to the container axis and the same number of flat internal faces, each internal face being parallel to an external face with uniform spacing between the external and internal faces of the various pairs. Each set of container faces defines a regular polygon and the portion of the container wall between each pair of inner and outer faces constitutes a transparent panel having plane-parallel faces. A body of transparent liquid is arranged within the container and in the liquid body are arranged a pair of reflectors parallel to the container axis and in proper angular relation to each other that a beam of light entering one exterior face of the compensator at right angles thereto is reflected to emerge from another exterior face of the compensator at right angles thereto. The extent of refraction of the light beam is determined by the length of its traverse through the refracting medium consisting of the container wall and the liquid body. Means are provided for adjusting the two reflectors in fixed relation to each other in a direction parallel to the plane bisecting the angle between the reflector frames and such adjustment of the reflector varies the length of the beam path in the refracting medium to vary the extent of beam deflecting effect by the refracting medium.

Other objects, novel features and advantages of this invention will become apparent from the following specification and accompanying drawings, wherein:

Fig. 1 is a horizontal section through a compensator embodying the invention, and Fig. 2 is a diagrammatic view illustrating two different adjustments of the reflectors.

In the drawings, 10 is a film gate over which a film 11 is drawn by means of the friction roller 12 driven by any suitable means, not shown. The film is illuminated by a light source 13 in combination with a condenser lens 14. For reasons which will later be apparent, the direction of film feed is horizontal with the film arranged in a vertical plane.

The compensator consists of a container 15 having a vertical wall and a horizontal bottom and a body of transparent liquid 16 within the container. The liquid in the container may be water or other liquid of suitable transparency having permanent characteristics. Means (not shown), are provided for supporting said container for rotation about a vertical axis. The vertical wall of the container consists of a given number of plane-parallel transparent panels 17 joined together at their abutting edges with liquid-proof cement and joined at their bottom ends by liquid-proof cement to the container bottom. The outer set of panel faces as well as the inner set of panel faces defines a regular polygon of a given number of sides symmetrical about the axis of rotation of the container. An objective lens 18 is supported exterior of the compensator with its optical axis 19 in the same plane with and intersecting the optical axis 20 of the condenser lens 14.

Within the container 15 and immersed in the liquid 16 are two reflectors 21 and 22, the surfaces of which are parallel to the rotational axis of the container 15. The reflector 21 intercepts the optical axis of the condenser lens 14 while the reflector 22 intercepts the optical axis of the objective lens 18. The angularity of the reflectors 21 and 22 with respect to each other is such that they reflect the light beam from the condenser lens 14 to the objective lens 18 and render the optical axes of the lenses in optical alinement.

The compensator 15 is made up of a composite refracting medium consisting of the container wall and the body of liquid. The extent to which a beam of light is refracted in passing from the condenser lens 14 to the objective lens 18 depends upon the length of its path in the compensator 15. For certain types of projection, for example, television, the extent of refraction must exactly equal the height of a picture frame. Frequently, a film shrinks on aging so that the height of its picture frame decreases and the length of the path of the beam in the compensator has to be varied to compensate for the shrinkage. For this purpose, the reflectors 21 and 22 are supported by a carriage (indicated by dot-dash lines) in fixed relation to each other and the carriage is mounted for reciprocation in a direction parallel to the plane bisecting the angle between the reflector plates and indicated by the line A—A. Such adjustment changes the length of the light beam path in the body of liquid as shown in Fig. 2.

In one adjustment of the mirrors, the light beam is reflected from the points $21a$ and $22a$ respectively, while in another position of the reflectors, the light beam is reflected from the points $21b$ and $22b$ as shown in Fig. 2. With the latter adjustment, the length of the light beam path exceeds the length of the light beam path in the former adjustment by an amount equal to the distance between $22a$ and $22b$ plus the distance between $21a$ and $21b$ plus also the difference in the distance between the points $21b$ and $22b$ and the distance between the points $21a$ and $22a$.

The film 11 is advanced at the usual projection speed of twenty-four frames a second. The compensator is rotated at such speed that it advances through the arc defined by a single panel for each film picture. Each panel is perpendicular to the optical axis of the condenser lens at the instant that the midpoint of the film picture coincides with the condenser lens optical axis. Such relation between the feed of the film and the rotation of the compensator is effected by any suitable regulating means such, for example, as the photo-electric means illustrated in Leventhal, et al. Patent No. 2,107,039. By means of the regulating means just referred to, the film and compensator are kept in synchronism irrespective of change of length of the film from its original or standard length.

In order to insure comparatively slow rotation of the compensator 15, the vertical wall of the container is made up of a large number of panels, thirty-two being shown in the accompanying drawing. The compensator is, therefore, caused to make one complete rotation for each thirty-two pictures or forty-five revolutions a minute. At this comparatively slow speed, the optical effect of turbulence produced in clear water or similar clear transparent liquid is impossible of detection by the human eye. Preferably, the arrangement of the various units is such that the path of the light beam lies near the bottom of the container and the height of the container wall is sufficient that the depth of the liquid minimizes any tendency to turbulence as a result of the rotation of the container. For proper operation of the compensator, the aperture in the film gate 10 is longer in the direction of film travel than a film frame and the peripheral extent of each panel 17 is less than the film gate aperture length but not less than a film frame.

It is of course understood that various modifications may be made in the device above described without in any way departing from the spirit of the invention as defined in the appended claims. It is contemplated that suitable means may be provided to actuate mechanism for adjusting the position of the mirrors so that correction for change in film length may be automatically accomplished.

I claim:

1. An optical compensator comprising a transparent rotatable container having an even number of flat exterior faces parallel to the optical axis and an equal number of flat interior faces, each interior face being parallel to an exterior face with uniform spacing between the exterior and interior faces of the pairs, a body of transparent liquid in said container, and a pair of reflectors within the liquid body parallel to the rotational axis and in proper angular relation to each other that a beam of light entering one exterior face of the compensator at right angles thereto emerges from another exterior face of the compensator at right angles thereto.

2. An optical compensator according to claim 1 characterized by means for adjusting said reflectors in fixed relation to each other in a direction parallel to the plane bisecting the angle between the reflector planes.

3. In combination, an optical compensator comprising a transparent rotatable container having an even number of flat exterior faces parallel to the container axis and the same number of flat interior faces, each interior face being parallel to an exterior face with uniform spacing between the interior and exterior faces of said pairs, a body of transparent liquid in said container, a condenser lens and an imaging lens exterior of said compensator having their axes intersecting in the container axis, and a pair of reflectors within said liquid arranged to optically aline the axis of said condenser lens and the axis of said imaging lens.

4. In the combination according to claim 3, means for adjusting said reflectors in fixed relation to each other in a direction parallel to the plane bisecting the angle between the reflector planes.

5. An optical compensator comprising a transparent rotatable container having an even number of flat exterior faces parallel to the optical axis and an equal number of flat interior faces, each interior face being parallel to an exterior face with uniform spacing between the exterior and interior faces of the pairs, a body of transparent liquid in said container, and a pair of reflectors within the liquid body parallel to the rotational axis and so arranged that a light beam passing into said compensator at right angles to one exterior surface is directed by said reflectors to emerge from said compensator at right angles to a different exterior surface.

6. An optical compensator according to claim 5 characterized by means for adjusting said reflectors in fixed relation to each other in a direction parallel to the plane bisecting the angle between the reflector planes.

JACOB F. LEVENTHAL.